United States Patent
Beaudoin et al.

[19]

[11] Patent Number: 6,155,581
[45] Date of Patent: *Dec. 5, 2000

[54] SUSPENSION SYSTEM FOR A LIGHT TRAILER

[76] Inventors: Maurice Beaudoin; Richard Beaudoin, both of 850, 111e Avenue, Drummondville, Quebec, Canada, J2B 4L6

[*] Notice: This patent issued on a continued prosecution application filed under 37 CFR 1.53(d), and is subject to the twenty year patent term provisions of 35 U.S.C. 154(a)(2).

[21] Appl. No.: 09/031,908

[22] Filed: Feb. 27, 1998

[51] Int. Cl.$^7$ ................................................ B62K 27/00
[52] U.S. Cl. ................................... 280/204; 280/124.128
[58] Field of Search ........................... 280/204, 124.116, 280/124.125, 124.128, 124.129, 124.131, FOR 105, FOR 110, FOR 111

[56] References Cited

U.S. PATENT DOCUMENTS

| | | | |
|---|---|---|---|
| 2,410,570 | 11/1946 | Davis | 280/124.128 |
| 2,550,084 | 4/1951 | Randleman | 280/124.128 |
| 3,840,085 | 10/1974 | Smith | 280/204 |
| 4,077,646 | 3/1978 | Watkins | 280/204 |
| 5,265,891 | 11/1993 | Diehl | 280/204 |
| 5,308,096 | 5/1994 | Smith | 280/204 |

FOREIGN PATENT DOCUMENTS

| | | | |
|---|---|---|---|
| 782643 | 12/1934 | France | 280/204 |
| 67334 | 1/1944 | Norway | 280/204 |

OTHER PUBLICATIONS

Inter Design, publicity leaflet entitled "Orby", O.R.B.I., dated 1996.

*Primary Examiner*—J. J. Swann
*Assistant Examiner*—James S. McClellan
*Attorney, Agent, or Firm*—Collard & Roe, P.C.

[57] ABSTRACT

A suspension system for a light weight trailer is disclosed. The trailer is of the type comprising a chassis frame including a lower frame assembly. The suspension system comprises a transversal bar extending outside the chassis along a rear end thereof. The transversal bar has frontwards curved end segments extending along a corresponding side frame member of the chassis having a pivot point pivotally connectable to the corresponding side frame member and a tip portion adapted to operatively connect a wheel of the trailer. A shock absorber associated with each curved end segment is provided. The shock absorber bar has a rear end connected to a location along the curved end segment opposite the tip portion thereof and a front end connected along the corresponding side frame member. The shock absorber bar extends below the curved end segment of the transversal bar and defines an acute angle therewith.

5 Claims, 4 Drawing Sheets

SUSPENSION SYSTEM FOR A LIGHT TRAILER

FIELD OF THE INVENTION

The present invention relates to a suspension system for a light trailer, such as a bicycle trailer adapted to be towed behind a bicycle.

BACKGROUND OF THE INVENTION

Recently, various types of bicycle trailers or strollers have been developed, the focus being generally directed to improve the attachment means to the bicycle or the way the trailer may be collapsed. However, because such trailers are mainly used for carrying small children, sometimes for long rides, a good suspension could be very advantageous for reducing the negative effects of vibration. In general, prior art bicycle trailers are not provide with an appropriate and effective suspension system.

The Applicant has already developed a bicycle trailer provided with a suspension system associated with each wheel. This suspension system was comprising a shock absorber bar disposed along a corresponding upright back frame member of the trailer and having an upper end secured to that upright back frame member. The suspension system was further comprising a pivot bar disposed below the lower side frame member of the trailer and having a front end secured to that side frame member and a rear end connected to the other end of the absorber bar. A wheel was operatively mounted along that pivot bar. Although this suspension system was providing a certain suspension to the trailer, it proved to be unsatisfactory on an economical point of view and also on a functional point of view.

Therefore, it is believed that there is presently a need for a good, effective and robust suspension system for those light bicycle trailers.

SUMMARY OF THE INVENTION

An object of the present invention is to provide a suspension system for a light trailer that satisfies the above mentioned need.

In accordance with the present invention, this object is achieved with a light weight trailer comprising:

a chassis frame including two oppositely disposed elongated side frame members defining a lower limit of the trailer;

a pair of oppositely disposed wheels for supporting the chassis; and a suspension system associated with each of the wheels, the suspension system comprising, for each wheel:

a shock absorber bar disposed along a corresponding side frame member and having a first end pivotally connected to said corresponding side frame member and a second end opposite the first end; and a pivot bar comprising:

a first end portion pivotally connected to the second end of the shock absorber; and a second end portion including a pivot point pivotally connected to said corresponding side frame member and another point distinct from the pivot point and adapted to operatively receive a corresponding wheel of the trailer.

Preferably, said another point of each pivot bar is positioned at an extremity of the second end portion of the pivot bar.

The object of the present invention is also achieved with a light weight trailer comprising a chassis frame including two oppositely disposed elongated side frame members defining a lower limit of the trailer, a pair of oppositely disposed wheels for supporting the chassis and a suspension system associated with each of the wheels. The suspension system is characterized in that it comprises, for each wheel, a pivot bar disposed along a corresponding side frame member. This pivot bar has a front end portion adapted to operatively receive a corresponding wheel of the trailer, an intermediate portion pivotally connected to the corresponding side frame member of the chassis, and a rear end portion opposite the front end portion with respect to the intermediate portion. The suspension system for each wheel further comprises a shock absorber bar extending along the corresponding side frame. The shock absorber bar has a rear end pivotally connected to the rear end portion of the pivot bar and a front end pivotally connected along the corresponding side frame member of the chassis, the shock absorber bar extending below the pivot bar and defining an acute angle therewith.

The suspension system preferably further comprises a transversal bar extending outside the chassis along a rear end thereof and connecting an extremity of the rear end portion of each of the pivot bars together, thereby reinforcing the suspension system.

Also preferably, the transversal bar and the pivot bars consist of a single elongated bar having two opposite end segments curved frontwards.

The present invention also relates to a suspension system for a light weight trailer of the type comprising a chassis frame including a lower frame assembly defining a lower limit of the chassis and two oppositely disposed wheels for supporting the chassis. The lower frame assembly is defined by two oppositely disposed side frame members, each having a front end and a rear end, a front crossbar connecting the front end of the side frame members together and a rear crossbar connecting the rear end of the side frame members together. The suspension system comprises a transversal bar for extending outside the chassis along the rear crossbar of the lower frame assembly. This transversal bar has frontwards curved end segments for extending along a corresponding side frame member of the chassis. Each of the curved end segments has a pivot point pivotally connectable to the corresponding side frame member and a tip portion adapted to operatively connect a wheel of the trailer. The suspension system further comprises a shock absorber bar associated with each curved end segment of the transversal bar and having a rear end connected to a location along the curved end segment opposite the tip portion thereof with respect to the pivot point and a front end connected along the corresponding side frame member. The shock absorber bar extends below the curved end segment bar and defines an acute angle therewith.

A suspension system according to the present invention is believed to provide a real comfort for the passenger using a light bicycle trailer by greatly reducing the vibrations of a trailer in motion.

The invention and its advantages will be better understood after reading the non restrictive description of a preferred embodiment of the present invention. This description is given with reference to the appended drawings.

| NUMERAL REFERENCE OF THE ELEMENTS | |
|---|---|
| 10 | collapsible trailer |
| 12 | chassis |
| 14 | wheels |
| 16 | hitch arm |
| 18 | upper frame assembly |
| 18a | upper side frame members |
| 18b | upper rear crossbar |
| 18c | rear end of each upper side frame members |
| 18d | upper front crossbar |
| 18e | front end of each upper side frame member |
| 18f | rear end of the upper frame assembly |
| 18g | front end of the upper frame assembly |
| 20 | lower frame assembly |
| 20a | lower side frame members |
| 20b | lower rear crossbar |
| 20c | rear end of each lower side frame members |
| 20d | lower front crossbar |
| 20e | front end of each lower side frame member |
| 20f | rear end of the lower frame assembly |
| 20g | front end of the lower frame assembly |
| 22 | hinge assembly |
| 22a | bolts and nuts |
| 30 | back frame unit |
| 30a | back frame members |
| 30b | first end of each back frame member |
| 30c | second end of each back frame member |
| 30d | back crossbar |
| 31 | hinge assembly |
| 32 | canvas |
| 50 | suspension system |
| 52 | transversal bar |
| 54 | curved end segments of the transversal bar |
| 56 | pivot point |
| 58 | tip portion of each of the curved end segments |
| 60 | shock absorber bars |
| 62 | rear end of the shock absorber bars |
| 64 | front end of the shock absorber bars |

DESCRIPTION OF A PREFERRED EMBODIMENT

Figure 1:
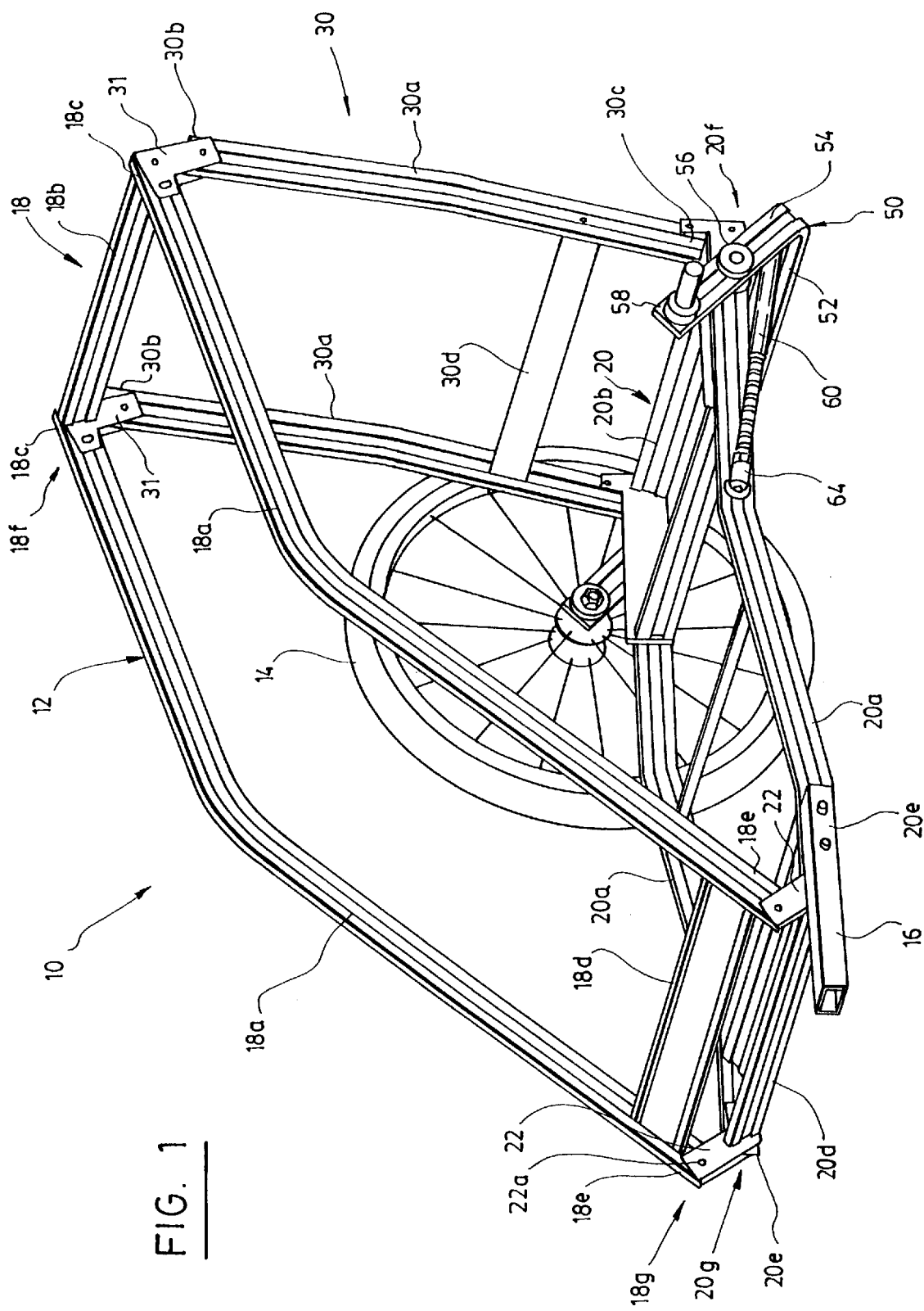
FIG. 1 is a perspective view of a bicycle trailer provided with a suspension system according to a preferred embodiment of the present invention, shown without the canvas and only one wheel.
Figure 2:
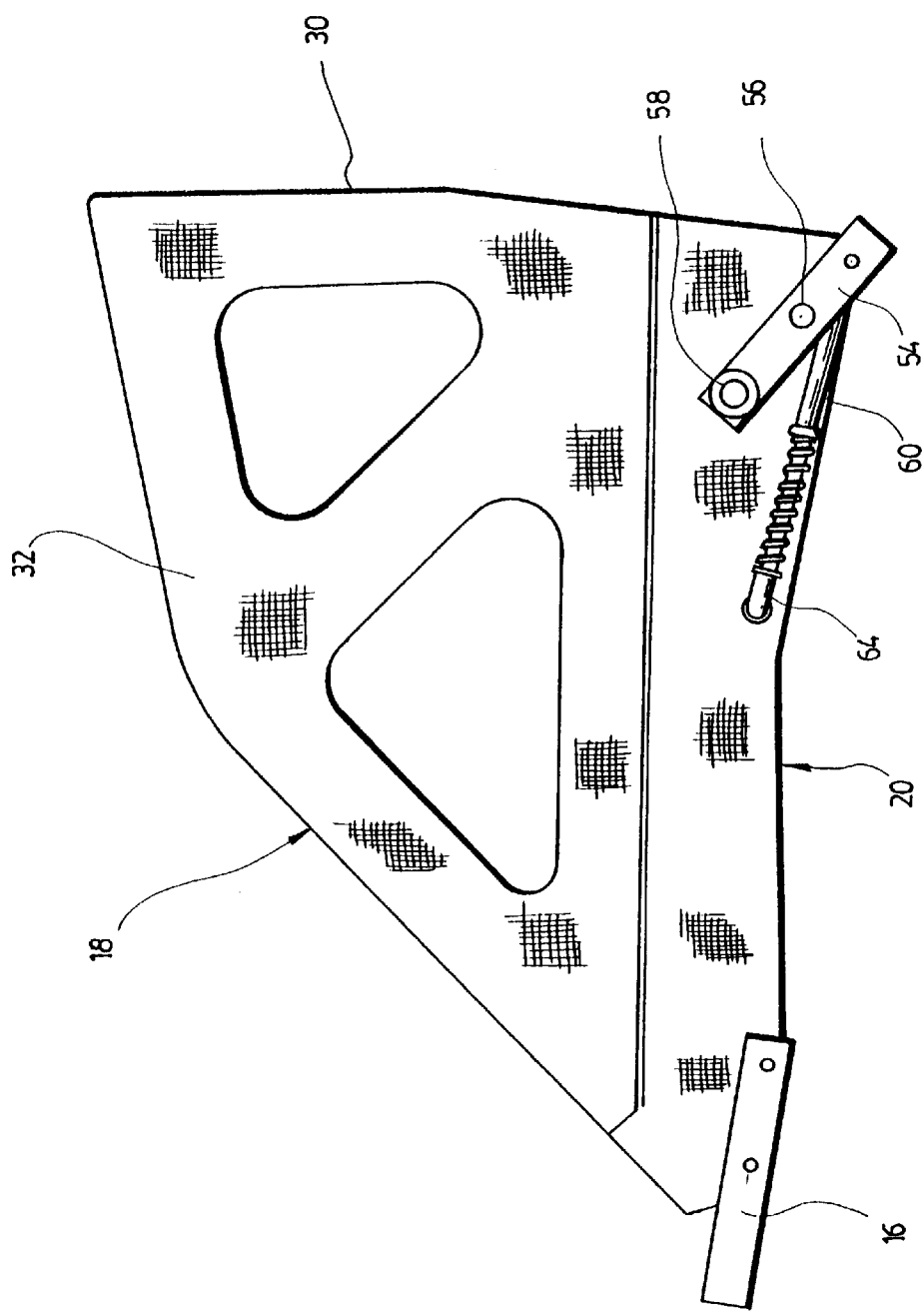
FIG. 2 is a side elevational view of the bicycle trailer of FIG. 1 shown with the canvas and no wheel.

Referring to FIGS. 1 and 2, a collapsible bicycle trailer (10) provided with a suspension system (50) according to a preferred embodiment of present invention is illustrated. It has to be understood that the suspension system could have been illustrated on another type of light trailer adapted to carry passengers such as a stroller or any children carriage. The components of the trailer (10) illustrated will be first described, then a description of the suspension system (50) will follow.

The trailer (10) comprises a chassis (12), two oppositely disposed wheels (14) operatively connected to the chassis (12), and a hitch arm (16) connected to the chassis (12) and extending forwards therefrom. The hitch arm (16) has an end adapted to be connected to a bicycle frame (not illustrated). The chassis (12) comprises an upper frame assembly (18) which is preferably defined by a pair of oppositely disposed upper side frame members (18a), an upper rear crossbar (18b) connecting the rear end (18c) of the upper side frame members (18a) together and an upper front crossbar (18d) connecting the front end (18e) of the upper side frame members (18a) together. As can be appreciated, the upper frame assembly (18) defines an upper limit of the chassis (12) with the rear crossbar (18b) and the rear end (18c) of each upper side frame members (18a) defining the rear end (18f) of the upper frame assembly (18) and with the front crossbar (18d) and the front end (18e) of each upper side frame member (18a) defining the front end (18g) of the upper frame assembly (18a).

The chassis (12) further comprises a lower frame assembly (20) defined by a pair of oppositely disposed lower side frame members (20a), a lower rear crossbar (20b) connecting the rear end (20c) of the lower side frame members (20a) together and a lower front crossbar (20d) connecting the front end (20e) of the lower side frame members (20a) together. As can be appreciated, the lower frame assembly (20) defines a lower limit of the chassis (12) with the rear crossbar (20b) and the rear end (20c) of each lower side frame member (20a) defining the rear end (20f) of the lower frame assembly (20) with the front crossbar (20d) and the front end (20e) of each lower side frame member (20a) defining the front end (20g) of the lower frame assembly (20a).

As illustrated, the front end (20g) of the lower frame assembly (20) is pivotally connected to the front end (18g) of the upper side frame assembly (18). More particularly, the front end (18e) of each upper side frame member (18a) is pivotally connected to the front end (20e) of its corresponding lower side frame member (20a) by means of a hinge assembly (22) consisting of a pair of parallel brackets between which said front ends (18e,20e) are each inserted. One or two bolts and nuts (22a) secure the front end (20e) of the lower side frame member (20a) in the hinge assembly (22) and a pivot pin pivotally connects the front end (18e) of the upper frame assembly (18a) therein.

The chassis (12) further includes a back frame unit (30) comprising a pair of oppositely disposed back frame members (30a). Each back frame member (30a) has a first end, in this case the upper end (30b), which is pivotally connected to the rear end (18c) of a corresponding upper side frame member (18a) by means of a hinge assembly (31) substantially similar to the one described hereinbefore. Each back frame member (30a) also has a lower second end (30c) removably securable to the rear end (20c) of the corresponding lower side frame member (20a) such that the back frame unit (30) is pivotable around the upper end (30b) of the back frame members (30a) between a folded position where the upper frame assembly (18) is rotated towards the lower frame assembly (20), for folding the chassis (12) into a compact position and an opened position, as shown in FIGS. 1 and 2, where the lower end (30c) of each of the back frame members (30a) is secured to the rear end (20c) of the corresponding lower side frame member (20a) for opening and keeping the chassis (12) into an extended position. The back frame unit (30) further preferably comprises a back crossbar (30d) connecting the back frame members (30a) together, thereby reinforcing the structure and enabling the back frame members (30a) to move as a unit.

As best seen from FIG. 1, the upper frame members (18a,18b), the lower frame members (20a,20b) and the back frame members (30a) each have a rectangular cross section and have two opposite side faces provided with a longitudinal groove adapted to receive an end of a corresponding crossbar.

Referring to FIG. 2, a canvas (32) is provided to tightly fit over the chassis (12).

SUSPENSION SYSTEM

Figure 3:
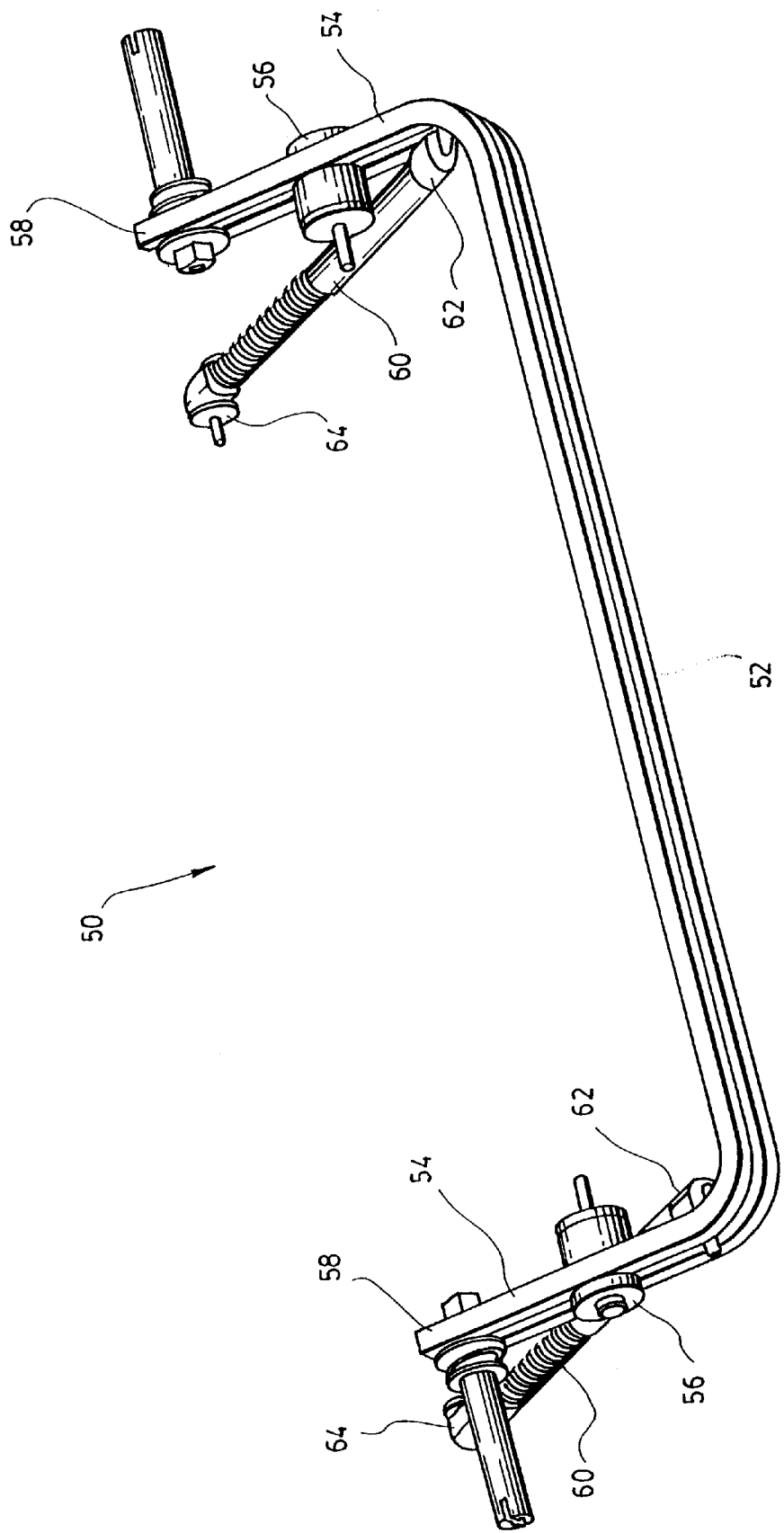
FIG. 3 is a perspective view of the suspension system of FIG. 1.

Referring more particularly to FIGS. 1 and 3, the suspension system (50) comprises a transversal bar (52) extending outside the chassis (12) along the lower rear crossbar (20b). This transversal bar (52) has frontwards curved end segments (54), also called pivot bars, extending outside the chassis along a corresponding lower side frame member (20a) of the chassis (12). Each of the curved end segments (54) has a pivot point (56) pivotally connected to its corresponding side frame member (20a) and a tip portion (58) adapted to operatively connect a wheel (14) of the trailer (10). The suspension system further comprises (50) a shock absorber bar (60) associated with each curved end segment (54) of the transversal bar (60). The shock absorber bar (60) has a rear end (62) connected to a location along this curved end segment (54) opposite the tip portion (58) thereof with respect to the pivot point (56) and a front end (64) connected along the corresponding side frame member (20a). As illustrated, the shock absorber bar (60) extends below the curved end segment (54) and defines an acute angle therewith.

Figure 4:
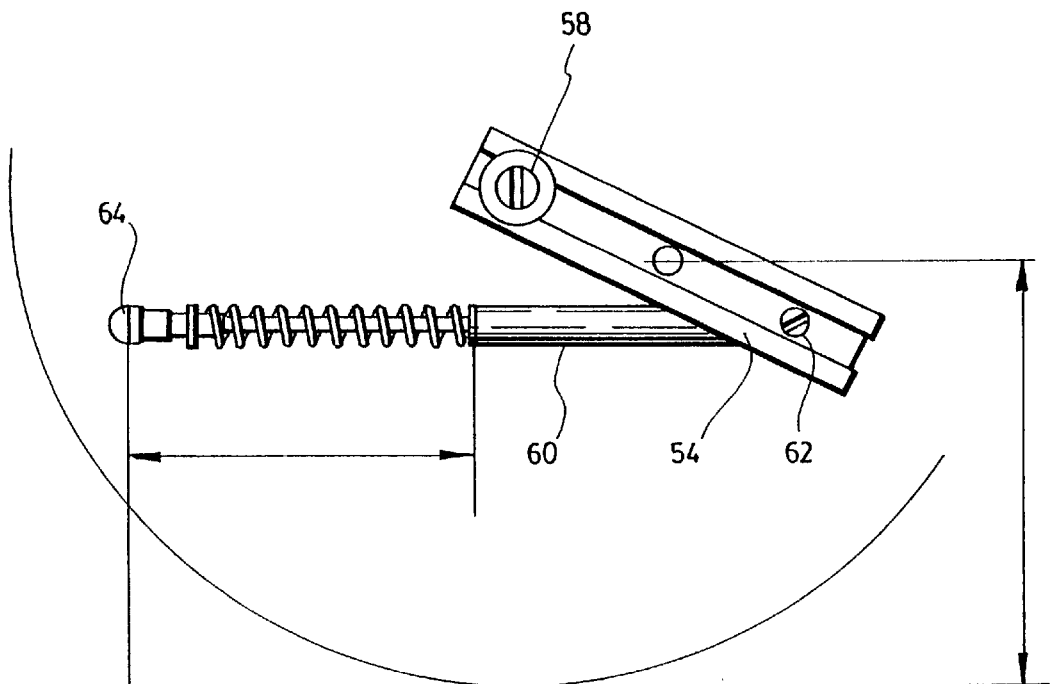
FIG. 4 is a side elevational view of the suspension system shown in FIG. 3 showing the shock absorber bar in an extended position.
Figure 5:
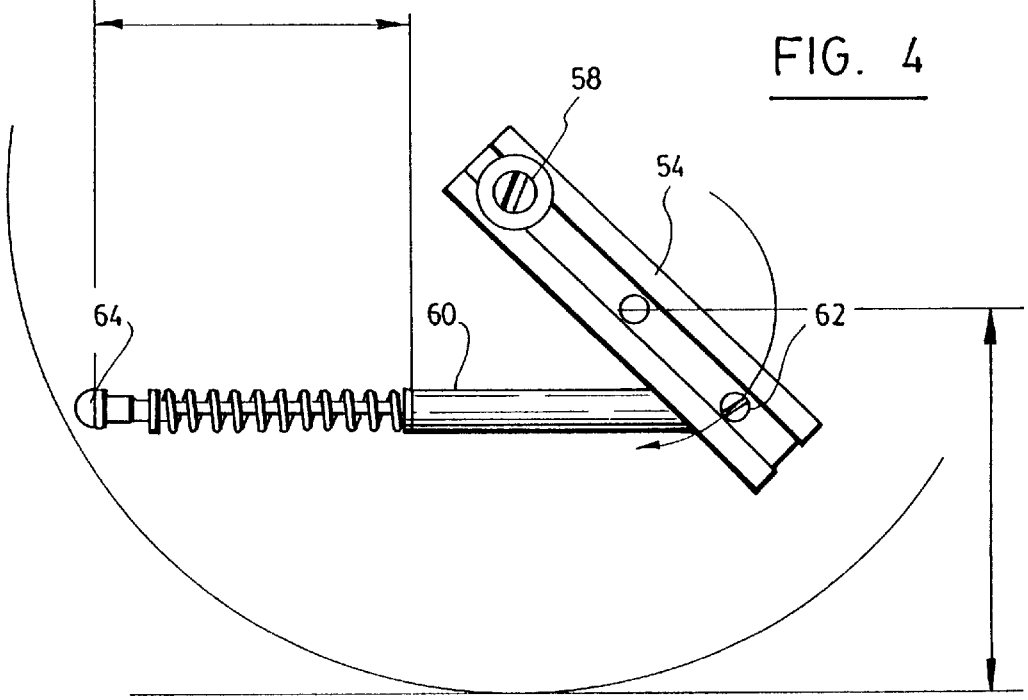
FIG. 5 is the same view as FIG. 4 showing the shock absorber bar in a compressed position.

Referring to FIG. 4, the shock absorber bar (60), which is extendable and compressible, enables the vibrations caused by the motion of the trailer to be absorbed, and thereby provides comfort for the passenger. The shock absorber bar (60) may be a hydraulic pneumatic, or mechanical bar. It could be an helicoidal spring bar, a rubber or neoprene bar or a mixture of those suspension elements.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention. For example, instead of pivotally connecting the intermediate point (56) of each pivot bar to its corresponding side frame member (20a), it is possible to pivotally connect the tip portion (58) of the pivot bar to the side frame member (20a) and then mount the wheel on the intermediate portion of the pivot bar. This arrangement will also provide a good suspension to the trailer.

What is claimed is:

1. A light weight trailer comprising:
   a chassis frame including two oppositely disposed elongated side frame members defining a lower limit of the trailer;
   a pair of oppositely disposed wheels for supporting the chassis; and
   a suspension system associated with each of the wheels, the suspension system comprising, for each wheel:
      a pivot bar disposed along a corresponding side frame member and having:
         a front end portion adapted to operatively receive a corresponding wheel of the trailer;
         an intermediate point pivotally connected to the corresponding side frame member; and
         a rear end portion opposite the front end portion with respect to the intermediate point; and
      a shock absorber bar extending along said corresponding side frame member, said shock absorber bar having a rear end pivotally connected to the rear end portion of the pivot bar; and
      said shock absorber bar having a front end pivotally connected to and along the corresponding side frame member of the chassis, in front of the intermediate point of the pivot bar.

2. A light weight trailer as claimed in claim 1, wherein the suspension system further comprises a transversal bar extending outside the chassis along a rear end thereof and connecting an extremity of the rear end portion of each of the pivot bars together.

3. A light weight trailer as claimed in claim 2, wherein the transversal bar and the pivot bars consist of a single elongated bar having two opposite end portions curved frontwards.

4. A light weight trailer comprising:
   a chassis frame including two oppositely disposed elongated side frame members defining a lower limit of the trailer;
   a pair of oppositely disposed wheels for supporting the chassis; and
   a suspension system associated with each of the wheels, the suspension system comprising, for each wheel:
      a shock absorber bar disposed along a corresponding side frame member and having a first front end pivotally connected to said corresponding side frame member and a second end opposite the first end; and
      a pivot bar comprising:
         a first end portion pivotally connected to the second end of the shock absorber; and
         a second end portion including an intermediate pivot point pivotally connected to said corresponding side frame member and
         another point distinct from the pivot point and adapted to operatively receive a corresponding wheel of the trailer; and
      said front end of the shock absorber bar, connected in front of the intermediate pivot point of the pivot bar.

5. A light weight trailer as claimed in claim 4, wherein said another point of each pivot bar is positioned at an extremity of said second end portion of the pivot bar.

* * * * *